W. BOYD.
GAS ENGINE.
APPLICATION FILED JAN. 24, 1918.

1,290,496.

Patented Jan. 7, 1919.
2 SHEETS—SHEET 1.

Witness
Inventor
W. Boyd
By C. A. Snow & Co.
Attorneys

W. BOYD.
GAS ENGINE.
APPLICATION FILED JAN. 24, 1918.
1,290,496.
Patented Jan. 7, 1919.
2 SHEETS—SHEET 2.
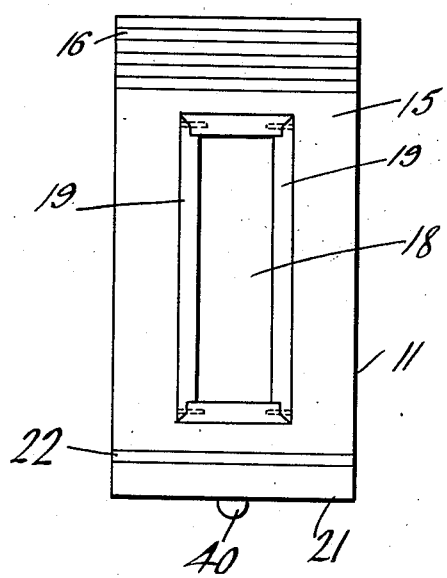
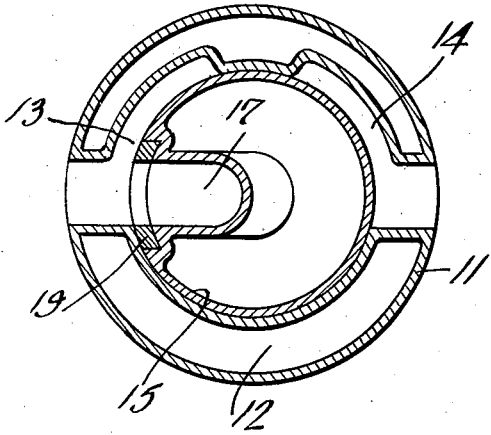
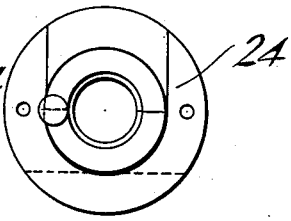
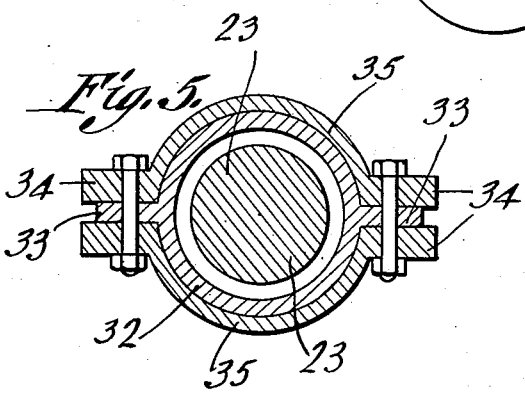
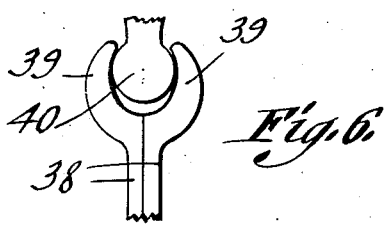
W. Boyd
Inventor
Witness
By C. A. Snow & Co.
Attorneys

UNITED STATES PATENT OFFICE.

WYATT BOYD, OF AKRON, OHIO.

GAS-ENGINE.

1,290,496. Specification of Letters Patent. Patented Jan. 7, 1919.

Application filed January 24, 1918. Serial No. 213,580.

*To all whom it may concern:*

Be it known that I, WYATT BOYD, a citizen of the United States, residing at Akron, in the county of Summit and State of Ohio, have invented a new and useful Gas-Engine, of which the following is a specification.

The subject matter of this invention is a gas engine and the invention contemplates more especially the construction of the piston and its rod.

The main object of the invention is to provide an intake and exhaust for the engine.

Another object within the contemplation of the invention is the provision of means for rotating the piston to permit intake and exhaust.

Another object contemplated by the invention is the provision of a connection between the piston and its rod.

A further object of the invention is the provision of means for rotating the piston from the crank shaft.

A still further object of the invention is the provision of a simple, durable, and efficient four-cycle engine.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

One practical embodiment of the invention is shown in the accompanying drawings, wherein:—

Fig. 2 is a cross section on the line 2—2 of Fig. 1;

Fig. 3 is a detail view in elevation of the piston.

Fig. 4 is a detail plan view of the split ring or plate;

Fig. 5 is a cross section on the line 5—5 of Fig. 1;

Fig. 6 is an enlarged detail view in elevation of the connection between the piston and sleeve.

Figure 1:
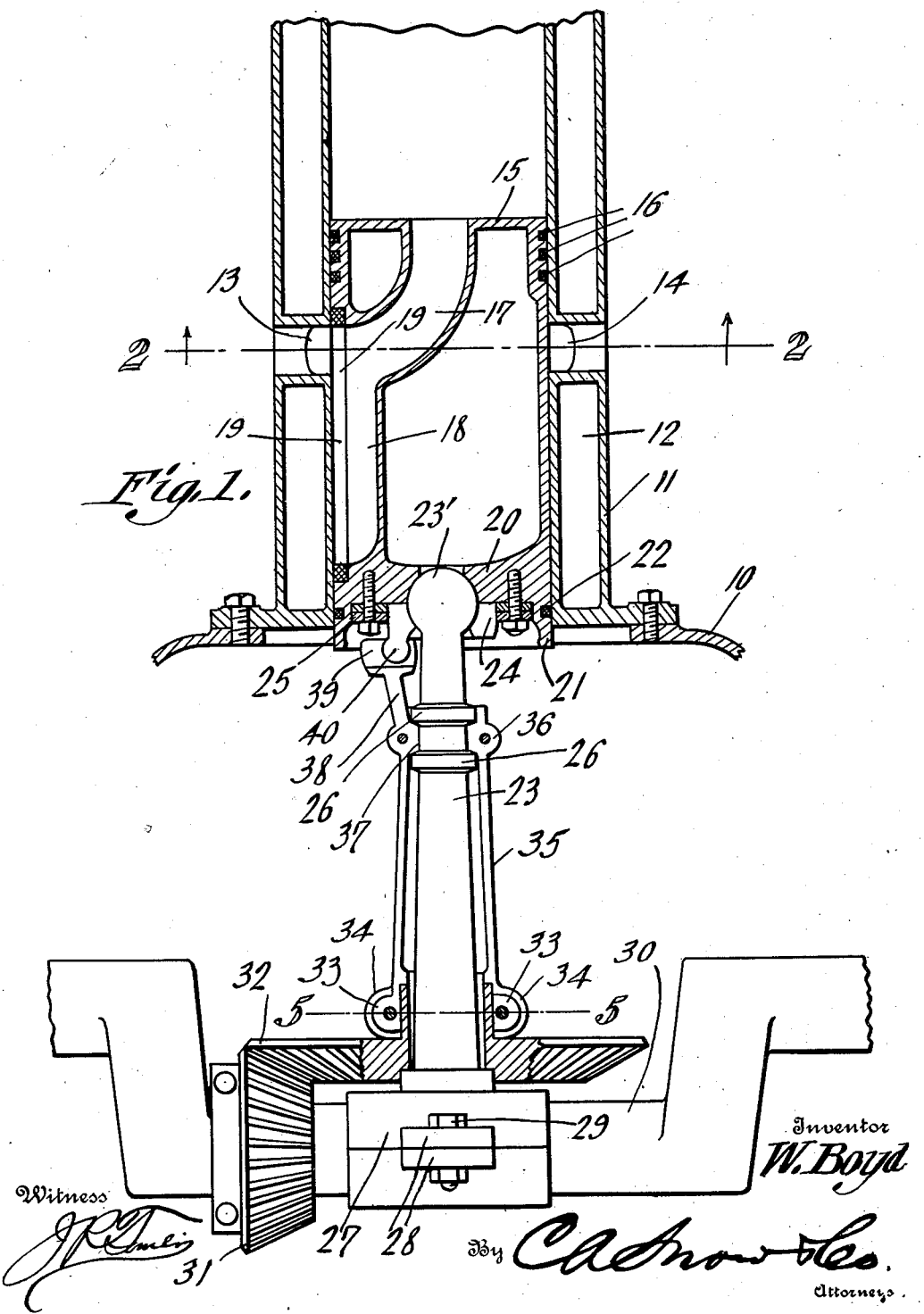
Figure 1 is a fragmentary view partly in central longitudinal section and partly in elevation of an engine constructed in accordance with the invention.

Referring to the drawings by numerals of reference:—

In carrying out the invention there is provided a supporting plate 10, which is usually the top of the crank casing; and to this plate is secured by screw bolts or otherwise the cylinder 11 which is by preference double walled to provide a water space 12 so that the cylinder may be properly water jacketed and cooled. Arranged circumferentially of the cylinder and located between the ends thereof is an exhaust duct 13 and an intake duct 14, each duct extending through substantially a quadrant of the circumference and the opposed ends of the ducts separated by a wall as seen most clearly in Fig. 2.

A hollow piston 15 is mounted for reciprocation within the cylinder 11 and is provided with the usual annular grooves in which are located the piston rings 16. A duct or by-pass 17 leads from the head end of the piston to a groove or depression 18 formed longitudinally of the piston and located between the ends thereof. The edges of the groove or depression 18 are rabbeted to receive the packing bars 19 for the purpose of providing a tight fit with the walls of the cylinder.

The crank end of the piston is headed, as at 20, and is provided with an annular apron 21 and with an annular groove in which is the packing ring 22. The head 20 is formed with a hemispherical depression to receive the spherical end 23' of a piston rod 23, which head 23' is held to oscillate in the depression by a split ring or plate 24 which is clamped to the head 20 by the screw bolts 25 or otherwise.

A pair of spaced, annular ribs or collars 26 are formed on the piston rod 23 and the crank end of the rod merges into a transversely arranged split sleeve 27 provided with lugs 28 which are apertured to receive the bolts 29, only one of which is shown, by which the sleeve is clamped with a turning fit about the crank 30 of the crank shaft.

A beveled gear 31 is rigid on the crank 30 and meshes with a beveled gear 32 which is mounted to turn on the piston rod 23. The hub of the beveled gear 32 has formed thereon a pair of diametrically opposed ears 33 which are apertured to aline with apertures formed in the ears 34 which extend from abutting edges of a split sleeve 35 and which are clamped on each side of the ears 33 by bolts or otherwise.

The sleeve 35 is also formed near its piston end with ears 36 which are apertured to receive bolts or other means for clamping the sections of the sleeve about the piston rod 23. The sleeve 35 is also formed with an interior annular rib 37 which is adapted to be seated between the ribs or collars 26 for the purpose of locking the sleeve against rectilinear movement longitudinally of the piston rod. An arm 38 extends from the piston end of the sleeve 35 at one abutting edge of each section thereof and each arm merges into a cross-head having an offset curved portion 39. A lug extends from the split ring or plate 24 and its spherical end is positioned to oscillate between the offset curved portions 39 to form a flexible joint between the sleeve and the piston so that rotary motion imparted to the sleeve may be communicated to the piston.

In practice the device operates in the following manner:—

Considering the device as shown in Fig. 1, with the engine running over, the engine is on its exhaust stroke and exhaust will be taking place from the head end of the cylinder, through the duct 17 and groove 18 to duct 13 and exhaust port during the up stroke of the piston. During the up stroke of the piston the crank shaft has undergone a half revolution which, through the gears 31 and 32, has imparted a quarter turn or rotation to the sleeve 35 and piston 15. This brings the groove 18 out of register with the duct 13 and, upon down stroke of the piston, into register with the duct 14 so that an explosive charge is being drawn into the cylinder through the duct 14, groove 18 and by-pass 17.

During the next up and down stroke of the piston, the groove and by-pass are out of register with the ducts 13 and 14 and compression and explosion take place.

By this structure the popping of the valves upon admission and exhaust is done away with and an efficient, economical, and noiseless engine is produced.

Having thus described the invention, what is claimed as new and sought by Letters Patent, is:—

A gas engine embodying a cylinder having an intake duct and an exhaust duct, a piston mounted for reciprocation within the cylinder, a by-pass in the piston and adapted to communicate with the ducts, a crank shaft, a piston rod connecting the piston and the crank shaft, a sleeve surrounding the piston rod, an arm extending from the sleeve and having a grooved head, a lug extending from the piston and having a spherical head engaged for oscillation within the groove, and gearing between the crank shaft and the sleeve for rotating the sleeve and piston to bring the by-pass into successive communication with the ducts.

In testimony that I claim the foregoing as my own, I have hereto affixed my signature in the presence of two witnesses.

WYATT BOYD.

Witnesses:
R. W. GALLOWAY,
HARMON N. SHIVELY.